United States Patent [19]

Emter

[11] Patent Number: 4,823,649
[45] Date of Patent: Apr. 25, 1989

[54] AUTOMATIC DUAL SIDE GRINDER

[76] Inventor: James Emter, 23429 NE. 29th Ave., Ridgefield, Wash. 98642

[21] Appl. No.: 162,196

[22] Filed: Feb. 29, 1988

Related U.S. Application Data

[63] Continuation-in-part of Ser. No. 788,925, Oct. 18, 1985.

[51] Int. Cl.$^4$ .............................................. B23D 63/14
[52] U.S. Cl. ......................................... 76/41; 76/42
[58] Field of Search ...................... 76/37, 25 R, 39, 40, 76/41, 43, 79, 42, 77, 35; 51/42, 40, 241 S

[56] References Cited

U.S. PATENT DOCUMENTS

| | | | |
|---|---|---|---|
| 3,850,052 | 11/1974 | Stier | 76/77 |
| 3,889,741 | 6/1975 | Stier | 76/112 |
| 4,018,109 | 4/1977 | Stier | 76/77 |
| 4,098,149 | 7/1978 | Wright | 76/40 |
| 4,366,728 | 1/1983 | Beck et al. | 76/41 |
| 4,750,387 | 6/1988 | Swiger | 76/37 |

OTHER PUBLICATIONS

IMW Brochure, IMW Inc. Model 200B, Automatic Dual Side Grinder, 2/29/88.

Primary Examiner—Roscoe V. Parker
Attorney, Agent, or Firm—Chernoff, Vilhauer, McClung & Stenzel

[57] ABSTRACT

An automatic dual sidegrinder for a circular saw includes precision adjustments for the tangential grinding angle, the radial grinding angle, and provides a high speed automatic regrinding operation. The tangential angle adjustment is made by a torsion bar that presses against a rotatable index finger stop. The torsion bar is moved by a screw bearing against it mounted in a fixture attached to the frame. The radial angle adjustment is made by turning cams mounted on bolts bored into a frame which are situated in slots cut into movable plates which support rotary grinding spindles. The cams rotate the plates, changing slightly the radial angle of attack of the grinding wheels. The speed of the saw is doubled by indexing the saw on the completion of both a forward and rearward longitudinal stroke of the grinding wheels. The drive motor for the longitudinal motion of the wheels has an output cam shaft with oppositely opposed flats. A switch having an input plunger responds to the flats when the shaft rotates so as to trigger an indexing mechanism which advances the saw one increment of rotation.

11 Claims, 3 Drawing Sheets

AUTOMATIC DUAL SIDE GRINDER

This is a continuation-in-part of my copending patent application Ser. No. 788,925 filed Oct. 18, 1985.

BACKGROUND OF THE INVENTION

The following invention relates to improvements in automatic saw sharpening machines of the type that grind the teeth of circular saws and the like from the side using a pair of grinding wheels.

An automatic dual side grinding machine is disclosed in the aforementioned co-pending U.S. patent application Ser. No. 788,925. That application discloses an automatic dual side grinder for circular saws and the like which includes a pair of spindles carrying rotary grinding wheels which are moved longitudinally into engagement with the teeth of a circular saw. The saw is mounted in the vertical plane and the grinding wheels traverse the sides of the saw teeth with a horizontal motion provided by a tie rod connected to a rotary cam which pushes a spindle assembly driving the wheels into engagement with these saw teeth. This is a reciprocating longitudinal motion and, under normal operation, the saw teeth are ground on the forward stroke and then the grinding wheels retract so that the blade may be automatically rotated by an indexing mechanism to present another tooth for grinding.

The indexing mechanism includes a finger which acts as a stop by engaging the scalloped outer portions of the blade which hold the carbide tips of saw teeth. A piston and cylinder drives a rotary shaft on which the blade is mounted to cause it to rotate until it engages the indexing finger.

There are two adjustments which are critical to proper sharpening of the saw teeth and both concern the position of the grinding wheels relative to the teeth. The first adjustment is called the tangential angle adjustment and relates to the vertical position of the grinding wheels with respect to each saw tooth. The saw teeth have a trapezoidal cross section and in saw regrinding, a choice can be made as to whether the grinding wheels will grind high or low on the sides of the teeth. In the past, the tangential angle adjustment has been made by adjusting the angle of the index finger relative to vertical. This was done by tightening a bolt which engaged the forward surface of the index finger causing it to pivot about a pin. This arrangement is unsatisfactory because the adjustment is not precise enough to meet the needs of current users of circular saws.

Another adjustment is termed the radial angle adjustment, in which the angle of attack between the grinding wheels and the saw teeth in the horizontal plane is altered. In the horizontal plane, the grinding wheels may be tilted off-axis (the axis of longitudinal motion) so that the saw teeth are ground at a slight angle. Nominally the longitudinal motion of the grinding wheels, which occurs in the horizontal plane, is parallel to the saw blade. The radial angle adjustment alters this so that the longitudinal movement of the grinding wheels may be offset slightly with respect to the plane of the saw blade. In the past this adjustment has been accomplished by loosening bolts which hold drive spindles mounted on plates attached to the frame so that the plates could be moved relative to the frame. A lack of precision has made this method of making the radial angle adjustment unsatisfactory.

SUMMARY OF THE INVENTION

The present invention provides a much faster and more precise regrinding operation than has been available in the past. The invention comprises a dual side regrinding apparatus for a circular saw which includes a frame supporting a pair of spindles, a rotary grinding wheel connected to each of the spindles for engaging the teeth of a circular saw, and tie rods driven by a motorized cam for driving the spindles in reciprocating fashion along their respective axes so as to grind saw teeth on both the forward and reverse strokes of the tie rods. The regrinding apparatus includes an automatic indexing feature for rotating the saw to bring its teeth into position for regrinding one by one. A switch responsive to the motorized cam triggers the indexing drive on both the completion of each forward stroke and rearward stroke of the spindles, to rotate the saw so that one tooth of the saw is reground during the forward stroke and a next tooth is reground on the rearward stroke. Coordinating the indexing of the saw with the end of the forward and rearward strokes of the grinding wheels effectively doubles the speed at which a saw can be sharpened.

The side grinder of the present invention also includes precision adjustments for the tangential angle adjustment and the radial angle adjustment. The tangential angle adjustment includes a torsion bar for urging an index finger, which operates as a stop by engaging the scalloped outer edges of the saw blade, to rotate it about its pivot axis thereby altering the tangential angle at which the teeth of the circular saw are reground.

The radial angle adjustment includes a pair of cams connected to a frame and situated within slots formed in the spindle support plates whereby turning the cams urges the plates to move along an arc in the horizontal plane thus changing the radial angle of attack between the grinding wheels and the teeth of the circular saw.

It is a principal object of this invention to provide an automatic dual side grinder for regrinding circular saws which provides high speed automatic saw regrinding.

A further object of this invention is to provide a saw regrinder for circular saws which is capable of precision adjustments in the radial angle and tangential angles at which the saw teeth are reground.

Yet a further object of this invention is to provide a double acting automatic dual sidegrinding machine which will grind saw teeth on both forward and reverse strokes of the grinding wheels.

A still further object of this invention is to provide precision tangential and radial angle adjustments for the grinding wheels of a saw regrinder which may be precisely set using precision distance measuring gauges.

DETAILED DESCRIPTION OF THE INVENTION

Figure 1:
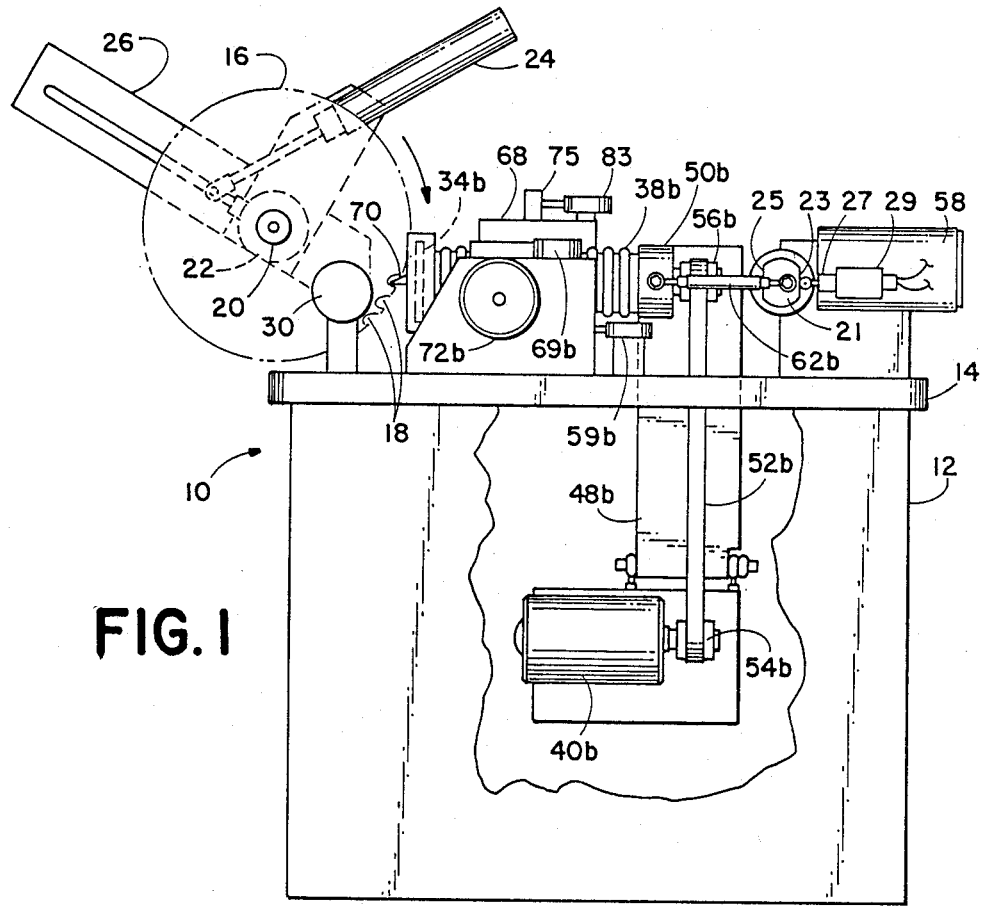
FIG. 1 is a partially cut-a-way side view of an automatic dual side grinder constructed according to the present invention.

A circular saw regrinding apparatus 10 includes a frame 12 which supports a table 14. A saw blade 16 comprising a plurality of teeth 18 is held by a clamping nut 20 to a spindle block 22. The spindle block 22 is connected to a pneumatic cylinder 24 which automatically rotates the circular saw blade 16. The spindle 22 and cylinder 24 are mounted on a support arm 26 which is pinned to the top of table 14. The saw blade 16 is held in position by a pneumatically actuated clamp comprising a pneumatic piston and cylinder 30 and a stop 32. The teeth 18 of the circular saw 16 are sharpened by a pair of diamond grinding wheels 34a and 34b. These grinding wheels 34a and 34b are mounted to spindles 36a and 36b which are covered with dust covers 38a and 38b.

Figure 2:
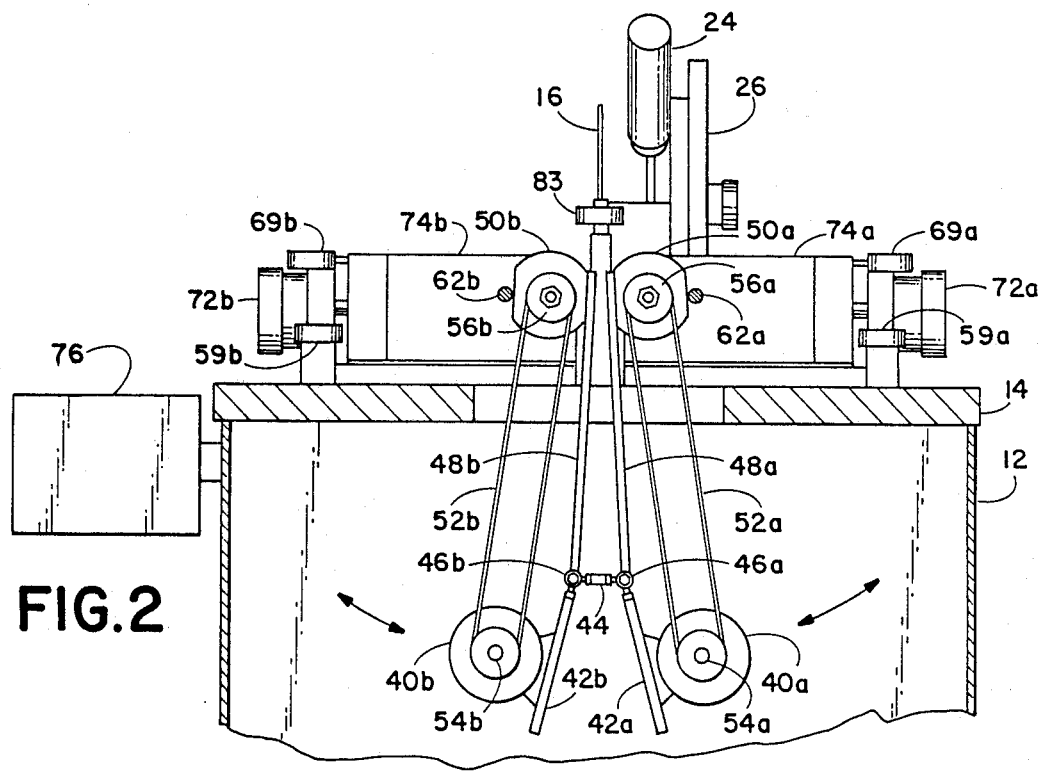
FIG. 2 is a partial rear view of the automatic dual side grinder of FIG. 1.
Figure 3:
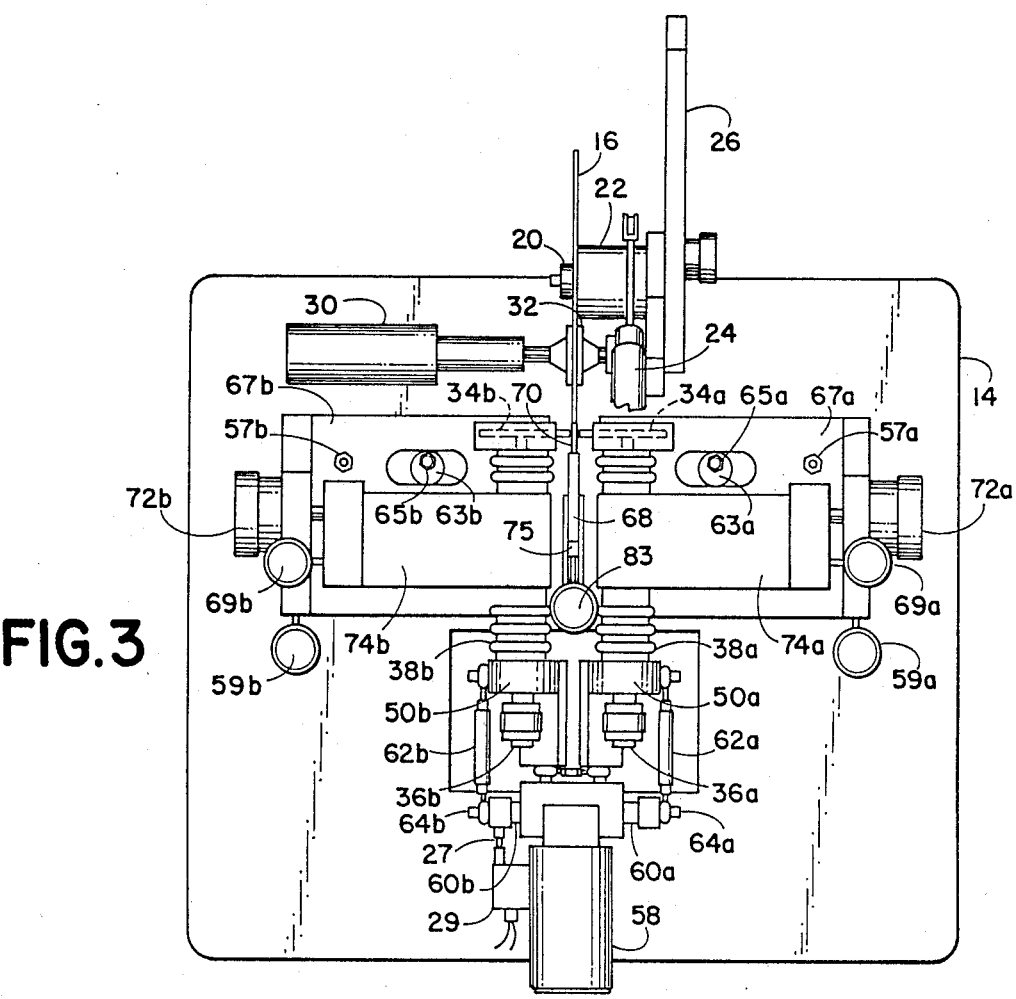
FIG. 3 is a plan view of the automatic dual side grinder of FIG. 1.

As shown best in FIG. 2 the spindles 36a and 36b are driven by a pair of motors 40a and 40b which are mounted on motor mounting plates 42a and 42b. The motor mounting plates 42a and 42b are connected together by a tie-rod 44. The tie-rod connects a pair of spherical swivels 46a and 46b so that the motors 40a and 40b will have a limited degree of freedom about both a horizontal and a vertical axis. The motors 40a and 40b are suspended from the spindles 36a and 36b by mounting arms 48a and 48b which are connected to bushed spindle clamps 50a and 50b. A pair of belts 52a and 52b are used to drive the spindles 36a and 36b by transmitting torque from motor shafts 54a and 54b to a pair of spindle bushings 56a and 56b. Thus, the motors 40a and 40b are entirely gravity suspended from spindles 36a and 36b by being fixedly attached to bushed spindle clamps 50a and 50b. Since the motors 40a and 40b are held to arms 48a and 48b by swivels 46a and 46b, the weight of the motors also serves to tension the belts 52a and 52b as shown by the arrows in FIG. 2.

Figure 5:
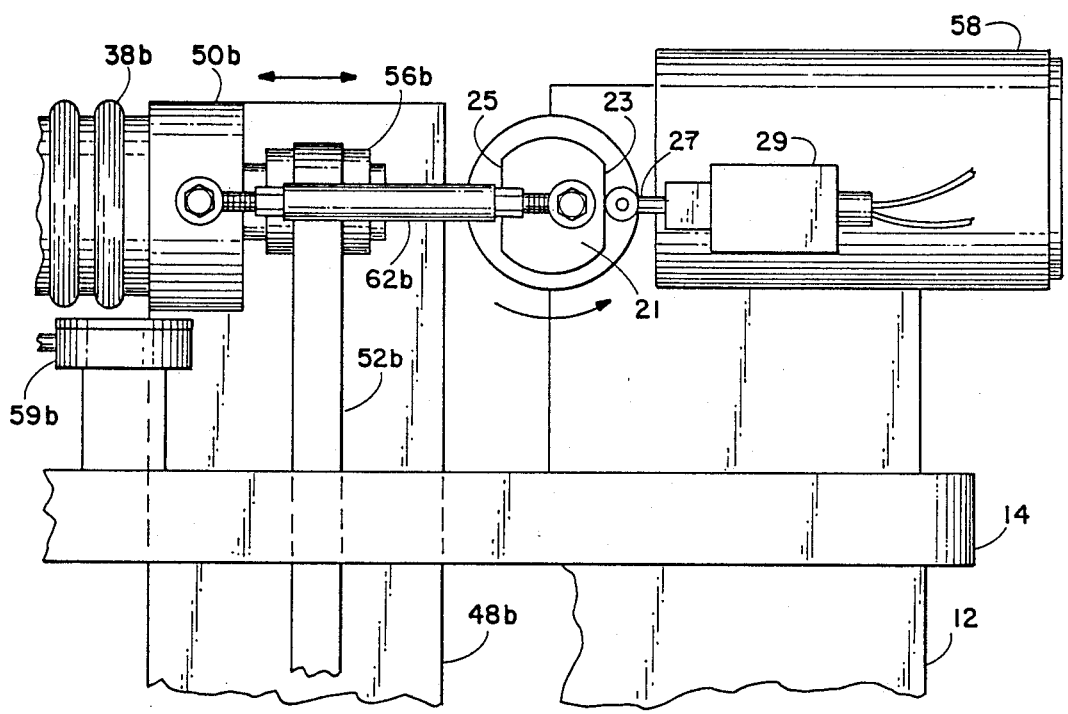
FIG. 5 is a detailed side view of the output cam of the longitudinal spindle drive and an associated indexing switch as shown more generally in FIG. 1.
Figure 6:
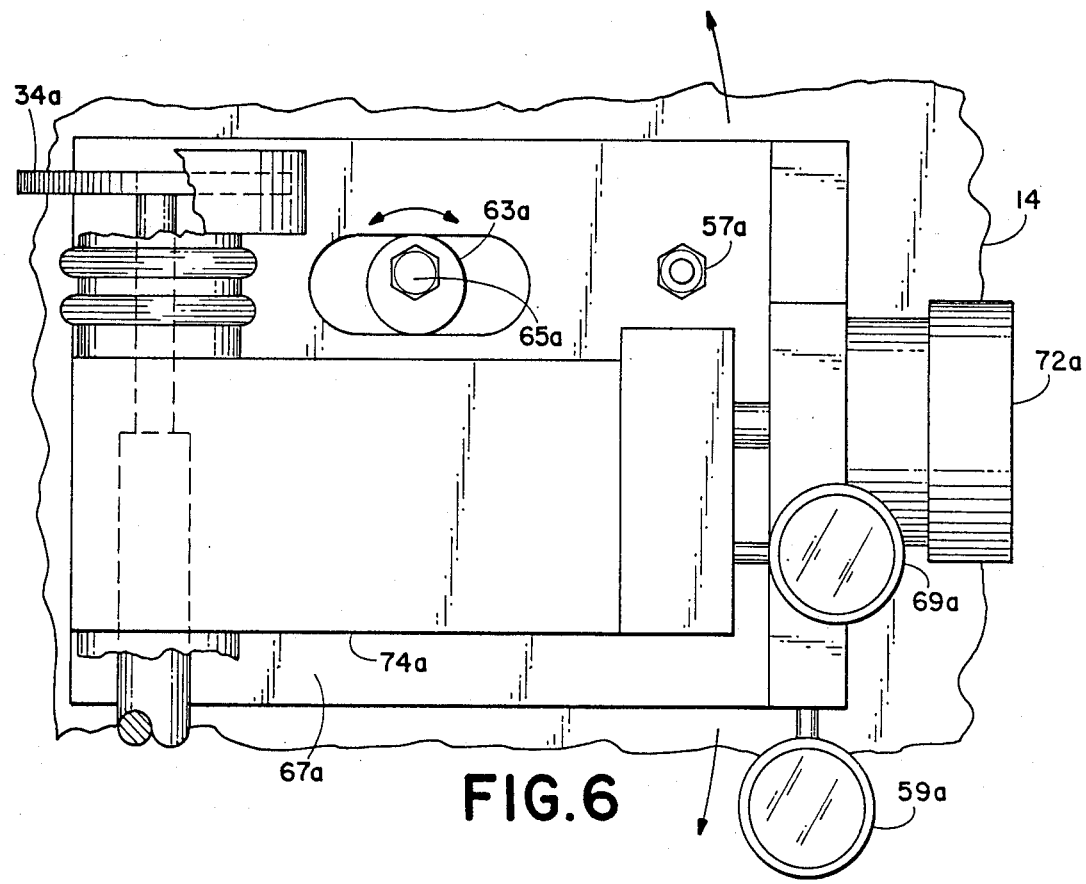
FIG. 6 is a detailed partial plan view of one of the regrinding spindle assemblies of FIG. 4 showing the radial angle adjustment.

The grinding wheels 34a and 34b are driven along the longitudinal axes of the spindles 36a and 36b in a reciprocating, or back and forth motion so that during a single stroke, either forward or reverse, the grinding wheels cover the length of the particular saw tooth 18 to be sharpened. The driving mechanism for the wheels 34a and 34b comprises a gear motor 58 which drives a pair of jack shafts 60a and 60b. The ends of the shafts 60a and 60b form a cam as best illustrated in FIGS. 1 and 5. A pair of tie-rods 62a and 62b are connected to swivel pins 64a and 64b on the ends of shafts 60a and 60b. Thus, as the shafts 60a and 60b rotate, the tie-rods 62a and 62b move back and forth. The other ends of the tie-rods 62a and 62b are connected to bushed spindle clamps 50a and 50b. A pair of counterweights 66a and 66b are included to stabilize the rods 62a and 62b. The bushed spindle clamps 50a and 50b are connected to the spindles 36a and 36b such that when the shafts 60a and 60b rotate, the spindles are driven longitudinally along their respective spin axes in a back and forth motion. Since the motors 40a and 40b are carried on the bushed spindle clamps 50a and 50b, these motors move in unison with the spindles 36a and 36b.

Figure 4:
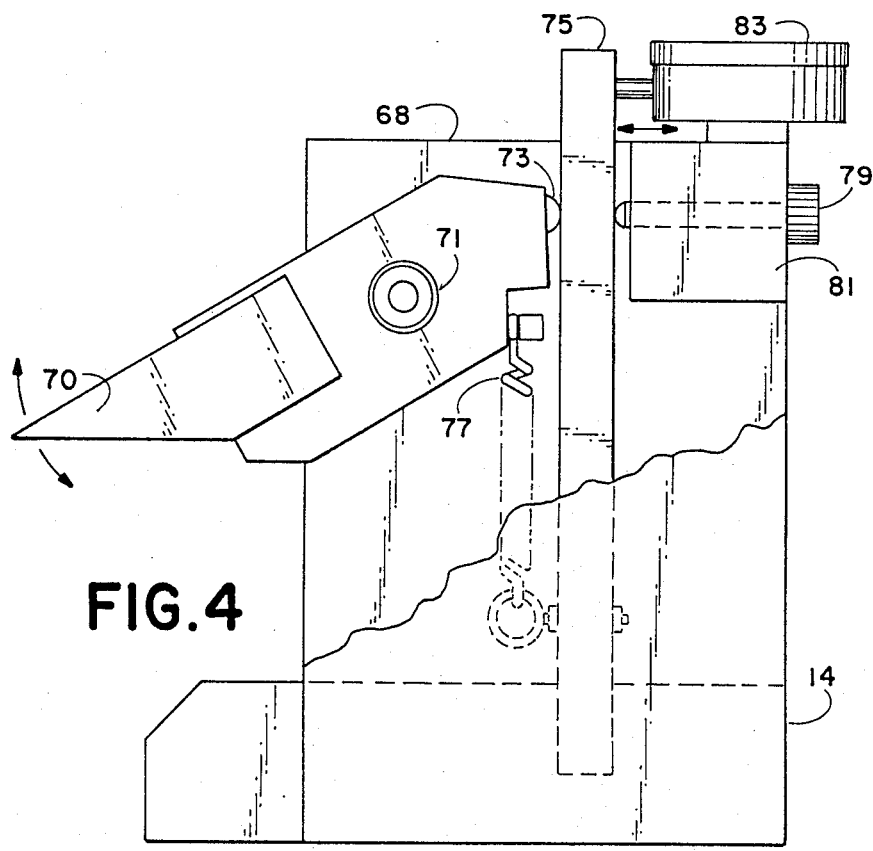
FIG. 4 is a detailed side view of the index finger stop for making the tangential angle adjustment for the automatic dual side grinder of FIG. 1.

An adjustable stop 68 which includes a finger 70 provides a tangential angle adjustment so that the degree to which the wheels 34a and 34b engage each of saw teeth 18 can be regulated. Referring to FIG. 4, the finger 70 is rotatably mounted to a pin 71 and includes a semi-spherical lug 73 positioned vertically above the pin 71. A torsion bar 75 is embedded securely in the table 14. The lug 73 bears against the torsion bar 75 because of biasing spring 77. The torsion bar 75 is urged against lug 73 by a screw 79 which is threaded through a frame member 81. When the screw 79 is tightened, torsion bar 75 is urged forward thereby causing finger 70 to rotate moving the saw teeth 18 in a downward vertical direction. When this occurs, the tangential angle adjustment is thereby altered so that regrinding occurs higher up on the saw teeth 18. A distance indicating gauge 83 can be used to calibrate the tangential angle adjustment with the turn of screw 79. This is a very fine adjustment because even several turns of screw 79 cause only slight movement of torsion bar 75.

The distance between the grinding wheels may also be regulated. This is accomplished by a pair of adjustment knobs 72a and 72b which move bushing blocks 74a and 74b either closer together or farther apart. Gauges 69a and 69b provide a visual means of calibrating this adjustment.

The bushing blocks 74a and 74b mounted on plates 67a and 67b are also rotatable about a vertical axis so that the radial angle of attack of the grinding wheels may be adjusted. This is a very fine adjustment and the angle varies by no more than 10 degrees. The freedom of movement of this 10 degree adjustment is allowed by the manner in which the tie-rod 62a and 62b are connected to bushing blocks 50a and 50b and by the manner in which tie-rod 44 connects motor mounting plates 42a and 42b. All of the aforementioned mountings use spherical swivels for the respective tie rod connections thus providing the necessary degree of rotatability. Thus, the arms 48a and 48b may rotate slightly about a vertical axis when the bushing blocks 74a and 74b are rotatably adjusted in the directions indicated by the arrows in FIG. 5. This adjustment is made by turning bolts 65a and 65b thus moving cams 63a and 63b. The cams move in slots 61a and 61b which are cut into plates 67a and 67b. Gauges 59a and 59b mounted to table 14 senses the motion of plates 67a and 67b thus providing an indication of the degree of adjustment. Once the proper adjustment has been made, the plates 67a and 67b may be tightened to table 14 by pressure-exerting bolts 57a and 57b.

Power is provided to the frame 12 by a control box 76 mounted on the side of the frame which contains appropriate pilot lights and function controls for the motors 40a and 40b and 58 as well as pneumatic cylinders 24 and 30.

The shafts 60a and 60b which drive tie rods 62a and 62b have output cams such as cam 21 (the other cam is not shown). The cam 21 includes two oppositely situated flat portions 23 and 25 which drive a plunger 27 which is connected to a microswitch 29. The microswitch 29 signals the piston 24 to rotate the saw blade 16 an increment corresponding to one tooth 18 whenever the plunger 27 encounters either flat portion 23 or 25. Thus, at the end of each stroke, whether forward or rearward, the blade 18 is rotated to bring up another tooth in position for regrinding. Thus a tooth is reground on the forward stroke of the wheels 34a and 34b, and the next tooth is reground on the reverse stroke.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a dual side grinder for resharpening the teeth of a circular saw blade, said dual side grinder comprising a frame supporting a pair of movable plates and having a pair of grinding wheels mounted thereon for grinding the teeth of said circular saw blade from either side thereof, the improvement comprising:

grinding wheel radial angle adjustment means comprising rotatable cam means affixed to said frame for interacting with said movable plates to selectively alter the radial angle between the grinding wheels and the teeth of the circular saw blade.

2. The dual side grinder of claim 1 wherein said cam means comprises a pair of rotatable cams mounted on bolts affixed to said frame, each of said cams and said bolts extending through slots in each of said movable plates, whereby rotation of each of said cams within their respective slots urges said movable plates to move along an arc, thereby altering said radial angle.

3. The dual sidegrinder of claim 2, further including locking means interacting between said plates and said frame for locking said plates at a predetermined radial angle.

4. The dual side grinder of claim 3, further including gauge means mounted on said frame for providing a visual indication of the degree of movement of the movable plates provided by said cam means.

5. The dual side grinder of claim 3 wherein said locking means comprises a pair of bolts extending through each of said plates, respectively, for applying friction to said frame as each of said bolts is tightened.

6. In a dual side grinder for resharpening the teeth of a circular saw blade, wherein said saw blade is held by a rotating spindle for advancing said teeth one by one into engagement with an indexing finger rotatably mounted about a pivot axis for holding each tooth to be resharpened in a predetermined vertical position relative to a pair of grinding wheels, the improvement comprising:

tangential angle adjustment means for said indexing finger comprising torsion bar means for urging said finger to rotate about said pivot axis thereby altering the tangential angle at which said teeth of said circular saw are resharpened.

7. The dual side grinder of claim 6 wherein said torsion bar means comprises a rod extending vertically from a frame and abutting said stop finger, and adjustable screw means having an end bearing against said rod for urging said rod to flex in a direction to urge said finger to rotate.

8. The dual side grinder of claim 7 wherein said torsion bar means further comprises bias spring means for urging said finger to rotate in a direction opposite that of the rotation caused by said adjustable screw means.

9. The dual side grinder of claim 8 further including a distance measuring gauge responsive to the movement of said torsion bar means for providing a visual indication of the change in the tangential angle adjustment caused by said screw means.

10. In a regrinding apparatus for a circular saw comprising a frame supporting a pair of spindles, a rotary grinding wheel connected to each of said spindles for engaging the teeth of said circular saw and having tie rod means driven by a motorized cam for driving said spindles in reciprocating fashion along their respective longitudinal axes, said regrinding apparatus further including indexing means for rotating said saw blade about a mounting axis to bring the teeth of said saw blade into position for a regrinding operation one by one, the improvement comprising:

switch means responsive to said motorized cam for triggering said indexing means on both each forward stroke of said spindles and on each rearward stroke of said spindles, to rotate said saw a predetermined increment each time, whereby one tooth of said saw is reground during a forward stroke and a next tooth is reground during a rearward stroke.

11. The dual side grinder apparatus of claim 10 wherein said motorized cam comprises an output shaft having a pair of oppositely opposed flat portions, said switch having a plunger means in contact with said cam whereby said plunger means is responsive to each of said flat portions when said cam rotates, for triggering said indexing means.

* * * * *